(12) United States Patent
Yoerkie, Jr. et al.

(10) Patent No.: US 6,260,660 B1
(45) Date of Patent: Jul. 17, 2001

(54) AIRCRAFT CABIN INTERIOR NOISE TREATMENT

(75) Inventors: Charles A. Yoerkie, Jr., Newington; Bryan T. Wadey, Woodbridge, both of CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 09/215,076

(22) Filed: Dec. 18, 1998

(51) Int. Cl.$^7$ ........................................................ E04B 1/82
(52) U.S. Cl. ............................................. 181/290; 181/286
(58) Field of Search ................................. 181/207, 208, 181/286, 288, 290, 291, 292, 294, 295

(56) References Cited

U.S. PATENT DOCUMENTS

| | | |
|---|---|---|
| 4,340,129 | * 7/1982 | Salyers .................................. 181/290 |
| 6,024,190 | * 2/2000 | Ritzema ................................ 181/286 |

* cited by examiner

Primary Examiner—Khanh Dang (74) Attorney, Agent, or Firm—Seidel, Gonda, Lavorgna & Monaco (57) ABSTRACT

A noise reducing blanket for use in an aircraft cabin for reducing acoustic noise transmission from an aircraft airframe to a cabin interior. The blanket includes a mass barrier portion, a foam portion having at least one cavity formed in it, and a vapor barrier which is disposed about the foam portion. The mass barrier portion includes a plurality of vinyl layers that are attached to one another at spaced apart locations. The spaced attachment allows the layers to move substantially independently from one another. The layers are preferably attached to one another by stitching that includes between approximately three to five stitches per inch. There are preferably at least two layers in the mass barrier portion, and, more preferably, between 2 and 4 layers in the mass barrier portion. The cavities in the foam portion are designed to increase the noise absorptive properties of the blanket. Preferably at least one of the dimensions of the cavities in the foam portion is approximately ¼ the wavelength of the dominant noise frequency to provide a resonant chamber within the foam portion. In one embodiment of the invention, the foam portion is attached to the mass barrier portion with an adhesive. In a second embodiment of the invention the foam portion is mounted to the aircraft separate from the mass barrier portion.

17 Claims, 9 Drawing Sheets

AIRCRAFT CABIN INTERIOR NOISE TREATMENT

TECHNICAL FIELD

The present invention relates to noise treatment for an aircraft cabin interior, such as a helicopter cabin interior and, more particularly, to insulating blankets for abating and/or reducing noise transmission from an aircraft airframe into a cabin interior.

BACKGROUND OF THE INVENTION

One of the major passenger complaints with aircraft travel is noise within the cabin section. Noise develops in an aircraft cabin from several sources. The most common sources are internally or externally mounted moving components, such as a transmission, engine or rotor system. Another source of cabin noise is air flows over various aircraft fuselage components, such as engines, landing gear, and cowlings. These components generate vibrations in the aircraft that propagate through the airframe and radiate into the cabin.

Noise is a particular problem in helicopter cabins since the rotor and transmission systems produce a significant amount of vibration in the airframe structure. This problem is more pronounces in helicopters than in fixed wing aircraft inasmuch as the dynamic components on a helicopter are mounted directly above the cabin, whereas the dynamic components on a fixed wing aircraft are mounted on the wings. These vibrations travel through the airframe structure and into the cabin interior resulting in structurally radiated noise due to vibration. It is not uncommon for noise levels within an uninsulated aircraft to reach upwards of 110 decibels or more, which can be very annoying and even harmful to the occupants.

The main noise problem in helicopter cabins is mid to high frequency gear whine noise from the main transmission. The main transmission of most helicopters is transmitting from several hundred to several thousand horsepower and is bolted directly to the cabin ceiling structure. This results in cabin noise vibrations typically from about 350 Hz through 4,000 Hz. In contrast noise vibrations from the main and tail rotor sources are in the 20 Hz to 125 Hz range and are attenuated by up to 40+ dB by the response of the human ear.

Aircraft cabin interiors are generally designed to keep aircraft interior noise below a certain level predetermined by competitive pressures in the marketplace. For example, the civilian S-76 aircraft made by Sikorsky Aircraft Corporation for executive transport has a design average noise level limit with the environmental control system (fans, vent air and cooling/heating system) turned off of approximately 75 dB SIL4. The SIL4 (Speech Interference Level 4) noise measurement metric is the arithmetic average of the sound pressure levels in the 500, 1000, 2000 and 4000 Hz octave bands. It rates steady noise according to it's ability to interfere with conversation between two people. The SIL4 noise measurement metric was developed by an engineer in the U.S. Navy in the 1950's and has been adopted as an ANSI (American National Standards Institute) standard.

Various attempts have been made by the assignee of the present invention to reduce noise levels within the cabin to below these values. One attempt was to incorporate a constrained damping layer on the airframe structure, i.e., frames, beams and skins. The constrained damping layer consisted of a layer of elastomer bonded to the airframe structure with an aluminum sheet bonded to the top. The constrained damping layer was designed to shift the location of the maximum shear loads from the airframe to the elastomer damping layer. The vibration induced shearing of the constrained elastomer damping layer assisted in dissipating the vibratory energy in the structure, in turn, reducing structurally radiated noise. The primary drawback to this design was that the damping elements had to be mounted at 102 separate locations which was very time consuming. A typical aircraft had to sit on the assembly line for an additional 1–2 days to install the constrained damping layers and allow the adhesive to cure.

A second attempt to reduce noise involved mounting 22 tuned high frequency (778 Hz., the primary gear mesh tone in the Sikorsky S-76 helicopter cabin) vibration absorbers around the cabin section of the aircraft. These absorbers were mounted directly on the airframe structure at locations defined during testing to have high vibratory levels on the cabin interior side of the airframe structure. While the vibration absorbers were effective, they had to be specifically tuned to the particular aircraft structure since each aircraft experiences slightly different vibrational loads. This again was a very tedious and time consuming effort substantially impacting the aircraft production process.

Other attempts were made to reduce the noise levels, such as the incorporation of tuned absorbers (again tuned to 778 Hz) on the aft end of the main transmission support beams above the cabin and the addition of weights to produce a vibration impedance mismatch on and/or near the foot of the transmission. Both of these attempts proved to be very heavy and very sensitive to small frequency variations.

Figures 1, 1A:
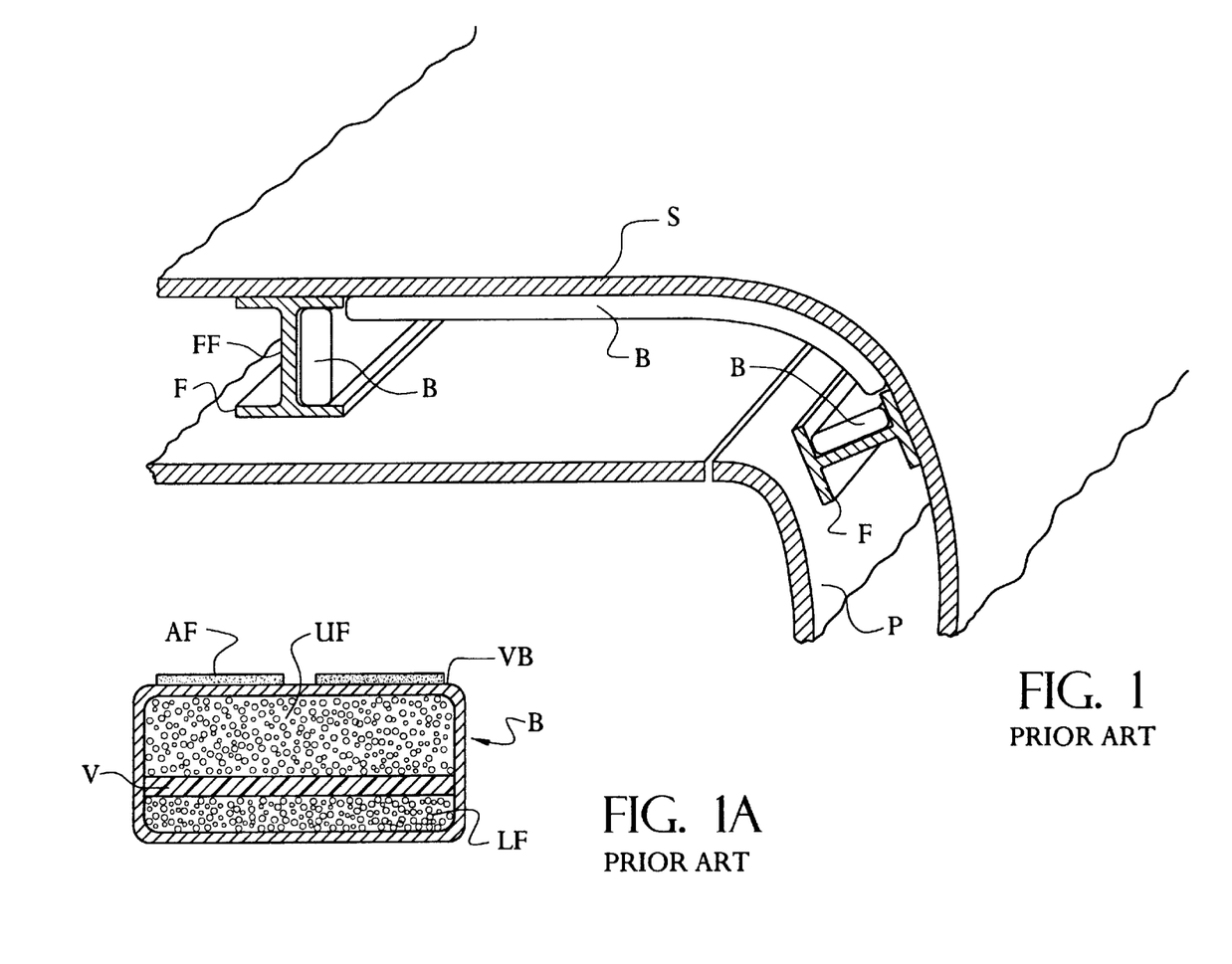
FIG. 1 is a partial isometric view of the upper portion of a helicopter cabin section structure illustrating a prior art noise reduction blanket installation.
FIG. 1A is an enlarged cross-sectional view of the prior art blanket used in the installation shown in FIG. 1.

A more recent attempt has been to use noise reduction or soundproofing blankets. As shown in FIGS. 1 and 1A, the blankets B are adhesively attached directly to the airframe skins S and frames/beams F in the upper bays of the aircraft cabin section where much of the noise is initially radiated into the cabin interior. The blankets B consist of a sandwich structure including a lower foam layer LF approximately ¼ inch thick, an approximately ⅛ inch thick vinyl mass barrier layer V, and an upper foam layer UF approximately ¼ to 1 inch thick. A vapor barrier VB made from a polyvinyl fluoride material sold by E. I. du Pont De Nemours and Company under the trade name TEDLAR surrounds the sandwich structure to prevent handling damage to the foam layers and prevent fluid absorption (water, oil, hydraulic fluid, etc.) by the foam layers.

This blanket arrangement proved to work very well at reducing noise. The blankets were also moderately easy to install since they included an adhesive film layer AF on the side of the blanket that was to be attached to the cabin interior trim panels P. However, the main deficiencies with this prior blanket arrangement were that it was very heavy (reducing the aircrafts' range and payload) and the blanket was relatively stiff making the blankets very difficult to physically install in the cabin overhead structure area.

A need, therefore, exists for an improved sound absorbing blanket for reducing noise in an aircraft cabin which is lightweight and easy to install.

SUMMARY OF THE INVENTION

An object of the invention is to provide an improved sound absorbing blanket for reducing noise in a aircraft cabin which is lightweight.

This and other objects and advantages of the invention are provided by a noise reducing blanket according to the present invention which reduces noise transmission from an aircraft airframe into an aircraft cabin. The blanket includes a mass barrier portion, a foam portion having at least one cavity formed in it, and a vapor barrier which is disposed about the foam portion.

The mass barrier portion includes a plurality of vinyl layers that are attached to one another at spaced apart locations. The spaced attachment allows the layers to move substantially independently from one another. The layers are preferably attached to one another by stitching that includes between approximately three to five stitches per inch.

There are preferably at least two layers of vinyl in the mass barrier portion. More preferably, there are between 2 and 4 layers of vinyl in the mass barrier portion.

The cavities in the foam portion are designed to increase the noise absorptive properties of the blanket. Preferably at least one of the dimensions of the cavities in the foam portion is approximately ¼ the wavelength of the dominant noise frequency being attenuated, resulting in a resonant chamber within the foam portion.

In one embodiment of the invention, the foam portion is attached to the mass barrier portion with an adhesive. In a second embodiment of the invention the foam portion is mounted to the aircraft separate from the mass barrier portion.

The foregoing and other features and advantages of the present invention will become more apparent in light of the following detailed description of the preferred embodiments thereof, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

DESCRIPTION OF THE PREFERRED EMBODIMENTS

Figure 2:
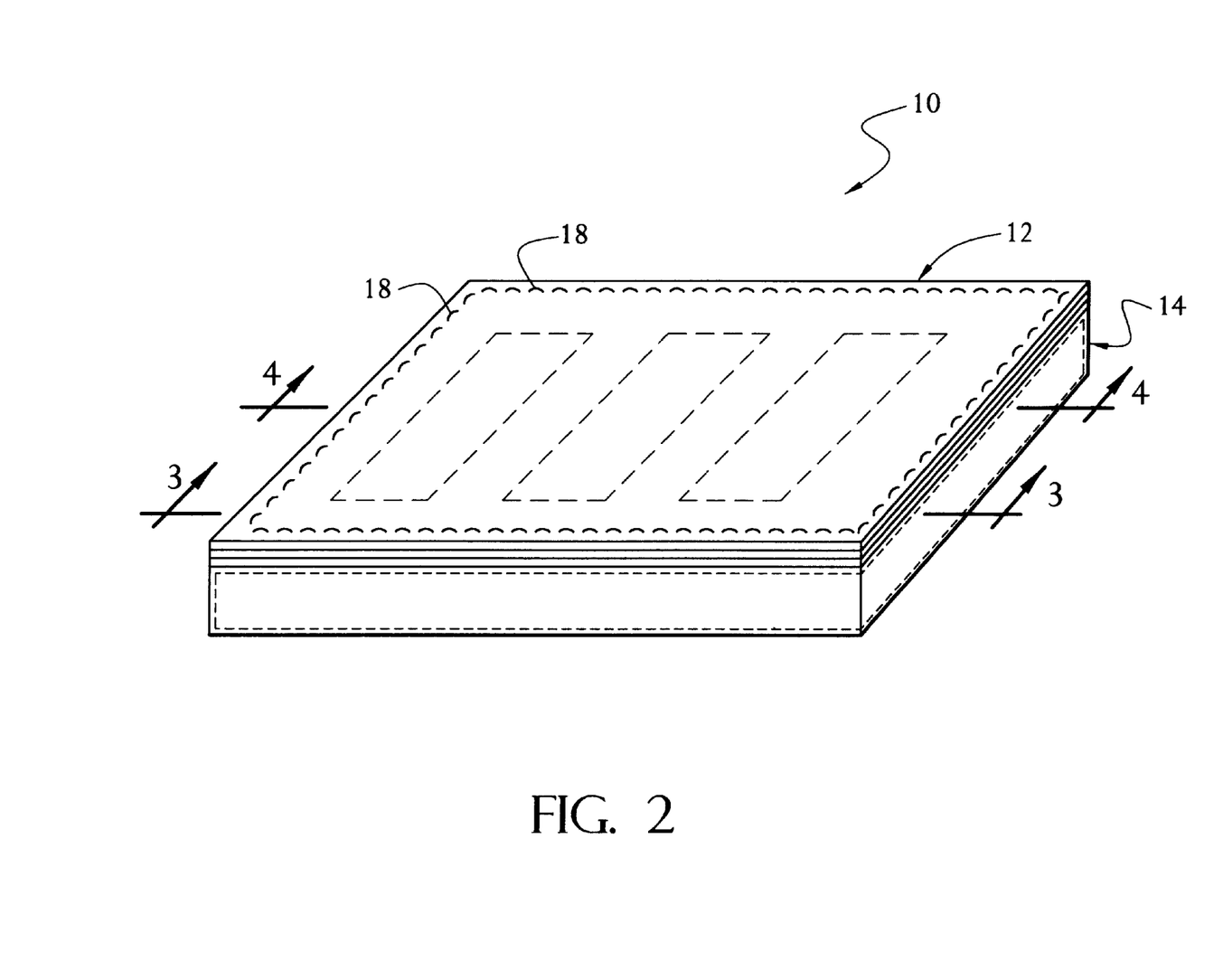
FIG. 2 is an isometric view of an acoustic blanket made according to one embodiment of the present invention for use in reducing noise in a helicopter cabin interior.

Referring now to the drawings wherein like reference characters identify corresponding or similar elements throughout the several views, FIG. 2 illustrates an improved insulating acoustic blanket 10 for a noise reduction installation in a helicopter cabin. The blanket 10 is intended to be used in the upper bays of a helicopter between the helicopter airframe and a cabin interior. More particularly, the blanket 10 is intended to be attached to or disposed between the frames, beams and skins of the helicopter and the cabin interior trim panels.

The blanket 10 includes a mass barrier portion 12 and a foam portion 14. The mass barrier portion 12 preferably includes a plurality of overlapping vinyl layers 16. Each layer is preferably made from virgin (high grade) vinyl which is mass loaded with barium sulfate powder, or similar dense material to increase its mass, and has a thickness of approximately 1/16 to ¼ inches. While vinyl is the preferred material because of its limpness, high inherent damping and relatively high density as measured in pounds/ft$^2$, the layers 16 can be made from a variety of alternate materials, such as silicone or rubber material. The materials used are selected on the basis of limpness, lowest stiffness, high relative surface density measured in lbs/ft$^2$, resistance to fire, low levels of toxic fume emission when exposed to flame, and cost. The multiple layers 16 of the mass barrier portion 12 help maximize the acoustic loss characteristics of the blanket 10 by providing a very flexible mass barrier. The number of layers 16 is selected to provide the desired limp mass effect within reasonable manufacturing cost. Preferably, the mass portion 12 includes at least two and, more preferably, between about 2 and 4 layers 16 of thin vinyl sheets.

Figure 3:
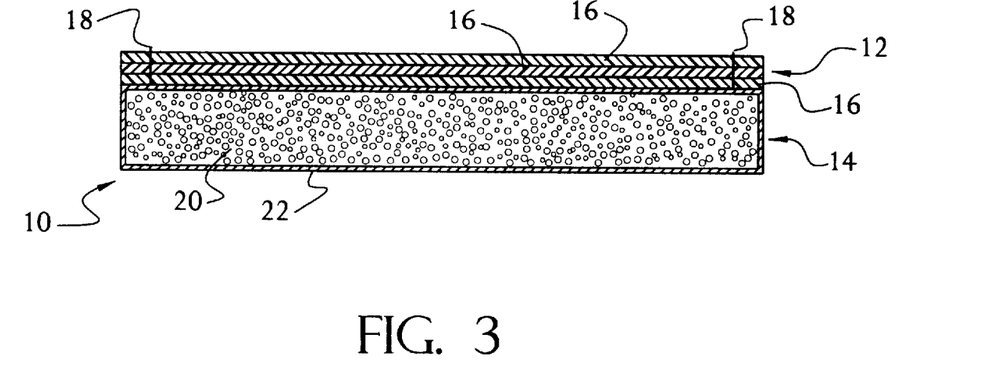
FIG. 3 is a cross-sectional view of the acoustic blanket taken along lines 3—3 in FIG. 2.

In order to allow the multiple layers 16 to function independently from one another and, thus, operate in as flexible a manner as possible, the layers 16 are not completely attached to one another. Instead, the layers 16 are stitched 18 or otherwise attached at prescribed locations to permit flexibility. As shown in FIGS. 2 and 3, it is preferable that the layers 16 are stitched along their peripheral edges. More preferably, the layers 16 are stitched approximately ⅛ inch from their peripheral edges. The preferred stitching pattern is three to five stitches per inch, but more can be used. It is desirable to use as few stitches per inch as possible in order not to stiffen the "limp mass" barrier or add weight to the structure. As such, the layers 16 are permitted to move independently and, thus, attenuate the acoustic energy that is being transmitting to the cabin interior from the airframe structure.

The foam portion 14 includes a foam core 20. The foam core 20 is preferably made from a low density (e.g., less than 2.0 lbs./ft$^3$) open cell foam, such as a polyimide or polyurethane foam. The foam thickness is preferably not less than ¾ inch. The foam thickness would typically be limited by the space available between the airframe structure and nearby structural, mechanical or electrical components. As an example, in the case of the transmission frame beam, the foam thickness was formed with a maximum thickness that would bring the outermost mass barrier 12 flush, or slightly recessed from the frame flanges of the "pockets" (identified as FF in FIG. 1) formed between the frame flanges. In other cases, such as on skin panels S, the foam thickness is limited by weight constraints and other objects in the overhead bays including the location of the interior trim panels P, and is typically about one inch thick. Other thicknesses can, of course, be utilized in the present invention. The thickness would be selected based on available space and not thicker than ¼ wavelength (which is equal to the speed of sound in air/(4× frequency)) of the dominant high frequency cabin noise source. As an example, the upper limit on thickness for the Sikorsky S-76 helicopter would be about 4¼ inches (e.g., (1,100 ft/sec×12 in/ft.)/(4×778 Hz)).

As discussed above, the blanket 10 according to the present invention is preferably installed in the upper portion of the cabin. As such, the blanket 10 is exposed to transmission, hydraulic fluids and moisture. To prevent these fluids from being absorbed by the foam core 20, which leads to added weight and premature deterioration of the foam, the present invention includes a vapor barrier 22 around the core 20. As shown in FIGS. 2 and 3, the vapor barrier 22 preferably completely surrounds the foam core 20 to prevent moisture from accumulating in the open cells of the foam 20. The vapor barrier 22 is preferably a fire retardant film material, such as a polyvinyl fluoride sold by E. I. du Pont De Nemours and Company under the trade name TEDLAR. The vapor barrier 22 is preferably about 0.002 inches thick and is attached to the foam core 20 through any conventional method, such as by use of an adhesive.

Figure 4:
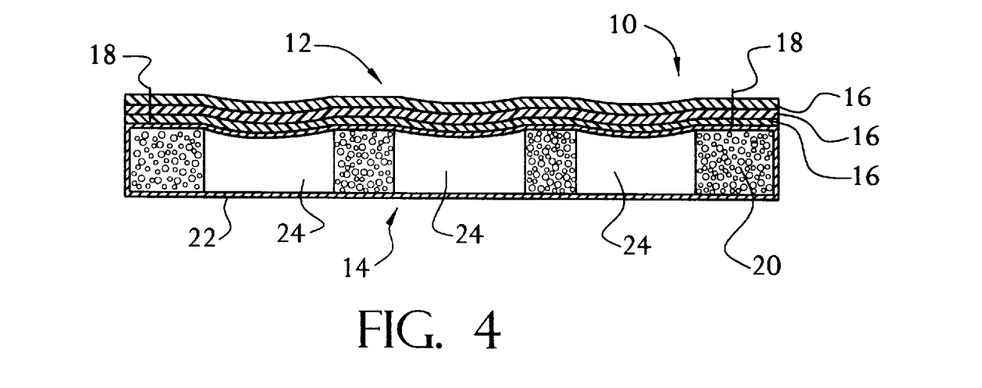
FIG. 4 is a cross-sectional view of the acoustic blanket taken along lines 4—4 in FIG. 3.

Referring to FIG. 4, at least one and, more preferably, a plurality of cavities 24 are formed in the foam core 20. The cavities 24 provide three key benefits. First, the cavities 24 help reduce the weight of the blanket 10, which is a major concern in an aircraft, by reducing the total volume of foam material used in the foam core 20. Second, the cavities 24 are configured to increase the acoustic attenuation characteristics of the foam core 20. That is, the cavities 24 provide increased foam core surface area. As a result, the incident wave of the airborne noise sound wave is further attenuated as it impinges on the added acoustically absorptive surface area. Third, The cavities are "tuned" by forming them with suitable length and width dimensions to provide passive sound wave cancellation. For example, for the Sikorsky Aircraft Corporation S-76B aircraft, the cavities 24 are formed with openings that have a length which is approximately ¼ the wavelength of the primary or dominant noise frequency in the aircraft, which in the S-76B aircraft is 778 Hz. The wavelength for the 778 Hz frequency is approximately 16–18 inches at normal temperature. Hence, the cavities 24 in the foam core 20 have a length and width dimension of about 4 inches. An additional factor affecting the length and width dimensions is the phase shift due to the foam core acoustical impedance. This is determined by testing so the reflected wave becomes out of phase with the incident wave in the cavity airspace.

The cavity 24 length dimension in the foam core 20 is preferably determined using the following equation:

$$L_P = \frac{c}{2\pi f}\left[\frac{\pi}{2} - \alpha_f\right]$$

where:
$L_p$ is the length of the cavity;
c is the speed of sound;
f is the tuned frequency;
$\pi$ is pi; and
$\alpha_f$ is the impedance phase angle of the foam material.

Testing was conducted on a foam core mounted in two separate Sikorsky Aircraft Corporation S-76 aircraft to prove that the cavities 24 provided increased noise attenuation. The results for both aircraft were identical, the foam core 20 with cavities 24 provided an additional amount of passive noise cancellation. over a foam core without cavities. At first, it was believed that the elimination of the foam in the cavities would lead to increased noise transmission. The resulting noise reduction in the aircraft was surprisingly unexpected.

Figure 10:
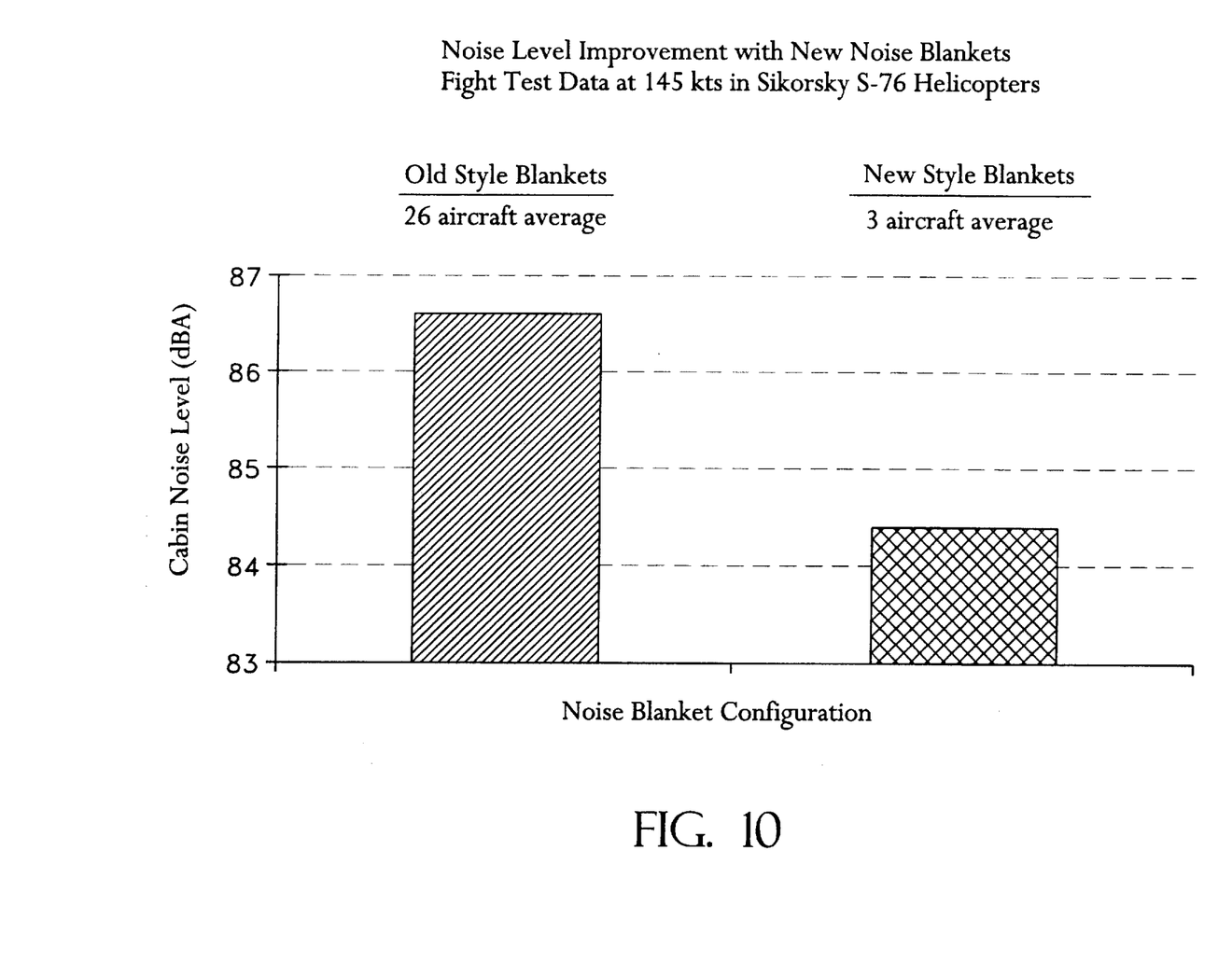
FIG. 10 is flight test data taken on Sikorsky Aircraft Corporation S-76 helicopter showing the cabin noise levels with the prior art soundproofing blankets vs. the noise reducing blankets according to the present invention.

FIG. 10 shows actual cabin noise levels, in overall dBA, as measured on Sikorsky Aircraft Corporation S-76 helicopters incorporating the prior art noise reducing blankets and the noise reducing blankets 10 made in accordance with the present invention. The present invention provided an average noise level reduction on three separate aircraft of 2.2 dBA.

A-weighting was used to determine the dBA noise reduction value. A-weighting involves the use of a table of corrections that are applied to octave sound pressure levels over the entire hearing frequency range. This results in weighted octave levels of equal perceived loudness. These octave levels are then summed logarithmically into an overall dBA level. The A-weighting scale approximates the frequency response of the human ear to sound. That is, the human ear is less sensitive to frequencies below 1,000 and above 4,000 Hz and, therefore, these frequencies are down-weighted on the dBA scale. For example, a tone in the 31.5 Hz octave would have to be roughly 39 dB higher than one in the 1,000 Hz octave to be perceived as equally loud. The A-weighting scale thus puts noise at frequencies over the whole hearing range on equal terms, with regard to human perception of noise, before they are summed to an overall level. The dBA scale was originally developed by two engineers (Fletcher & Munson) at Bell Labs in the 1930's as a standard for the electrical weighting of networks in sound level meters.

Figure 11:
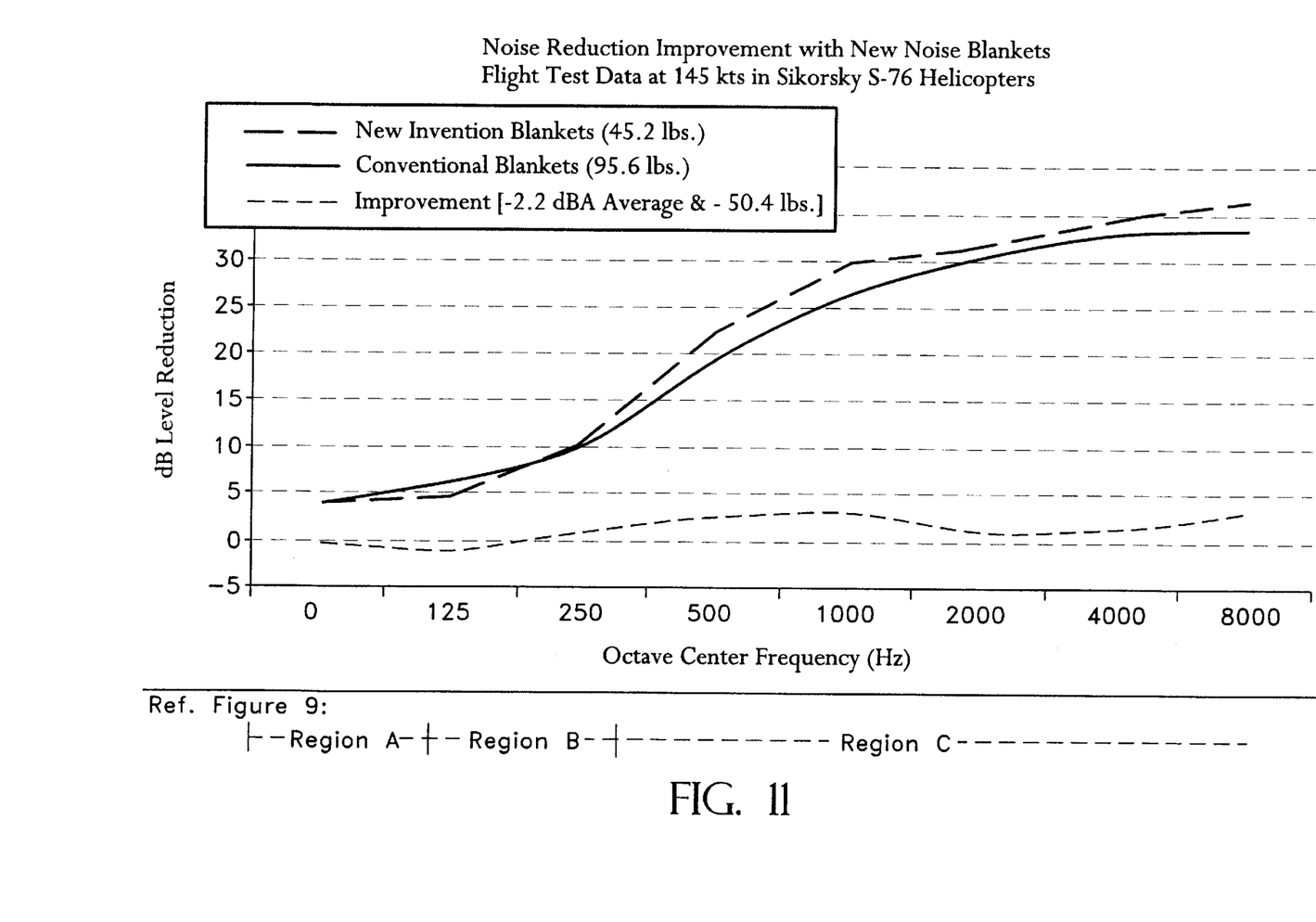
FIG. 11 is flight test data taken on Sikorsky Aircraft Corporation S-76 helicopters showing the cabin noise level and weight reduction improvements using the present invention.

FIG. 11 shows the cabin noise level improvement across the full noise spectrum from the 63 Hz octave through the 8,000 Hz octave. This demonstrates how the multilayer barrier 12 actually provides improved noise reduction in the mid to high frequency regions, illustrated in FIG. 9, while still resulting in an overall soundproofing weight reduction of 50.4 pounds.

Figure 5:
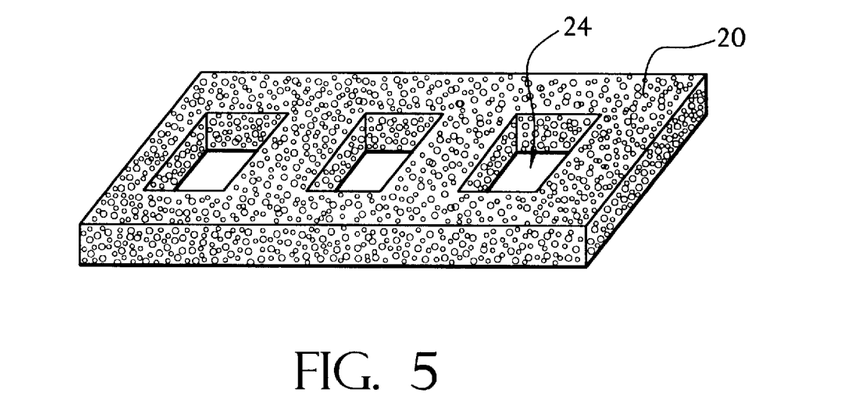
FIG. 5 is an isometric view of a foam core for use in the acoustic blanket of FIG. 3.

Referring now to FIG. 5, the foam core 20 is shown without the vapor barrier 22 and the mass barrier 12. As shown, the cavities 24 in the foam core 20 are preferably arranged in a row. While a single row of square cavities 24 is shown in FIG. 5, a variety of alternate arrangements can be substituted for the illustrated embodiment. For example, the cavities 24 can be rectangular in shape and/or multiple rows can be incorporated into the foam core. The rows can be staggered in a checkerboard manner if it is desired to disperse the noise wave. Preferably, the cavities 24 extend completely through the foam core 20 thickness as shown.

Figure 6:
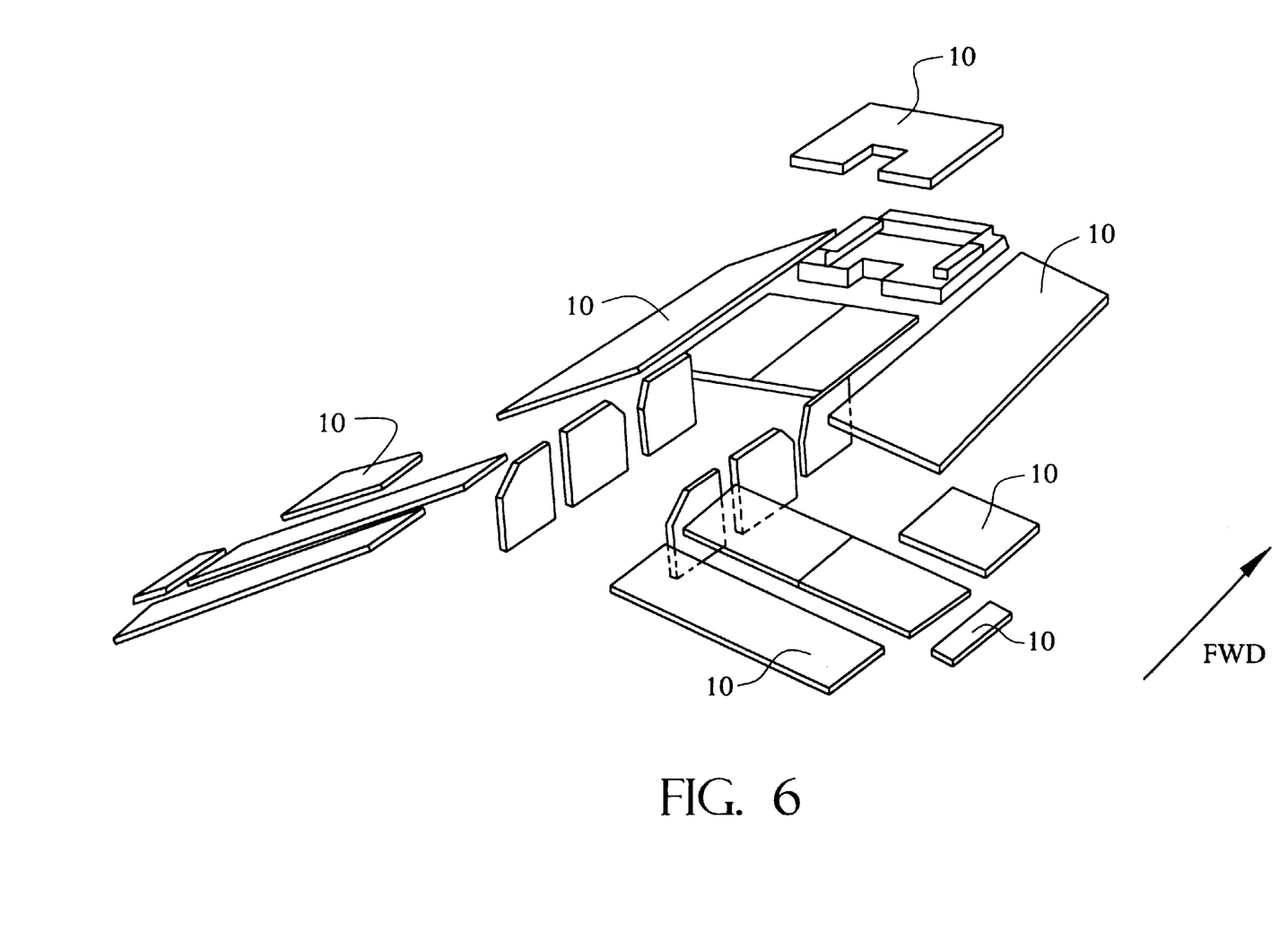
FIG. 6 illustrates one preferred mounting arrangement of multiple acoustic blankets to the cabin overhead structure in the mid and aft portion of the cabin of a Sikorsky Aircraft Corporation S-76 aircraft.

Referring to FIG. 6, a plurality of blankets 10 are shown as they are intended to be arranged for incorporation into the mid and aft cabin of a Sikorsky Aircraft Corporation S-76 aircraft. The blankets 10 are made according to the teachings provided hereinabove and are mounted to the airframe structure in the upper bays. In particular, the blankets 10 are mounted such that the foam core 14 is adjacent to the airframe and the mass barrier 12 is toward the open cabin interior space. In this embodiment of the invention, the foam portion 14 is attached to the mass barrier portion 12 using a suitable adhesive, such as a fire retardant acrylic adhesive. The blanket 10 is attached to the airframe structure using a suitable adhesive, such as an acrylic adhesive. An added benefit provided by the acrylic is that it provides a flexible bondline between the blanket 10 and the airframe. This is particularly important because the aircraft structure has mechanical component sources vibrating it at frequencies of up to 1,000 Hz and above. Hence, it is desirable to maintain a flexible bondline between the blanket and the airframe to prevent the blanket from falling off.

Figure 7:
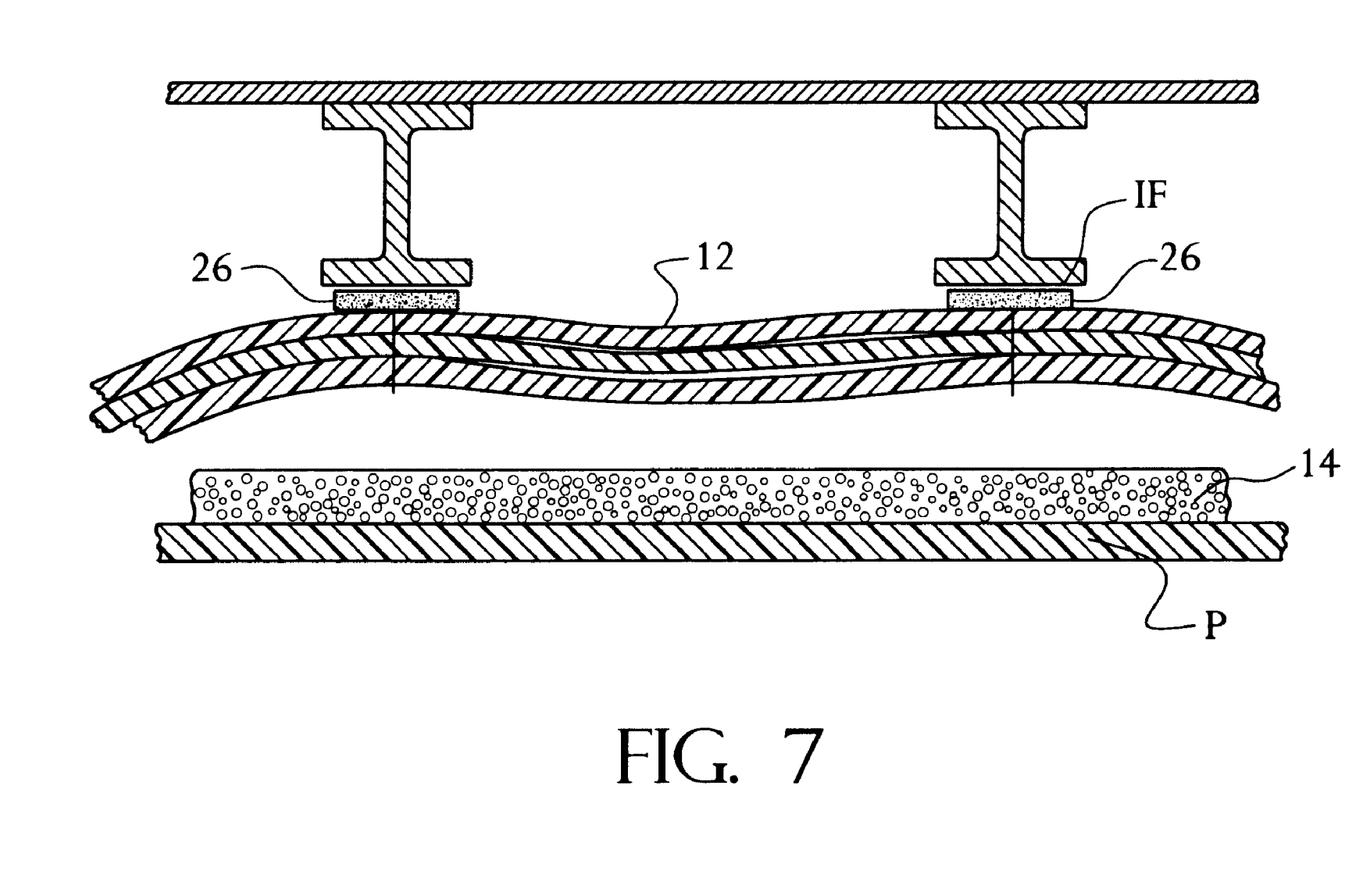
FIG. 7 illustrates an alternate embodiment of the acoustic blanket for use on the lower frame caps in the forward portion of the cabin of a Sikorsky Aircraft Corporation S-76B aircraft.
Figure 8:
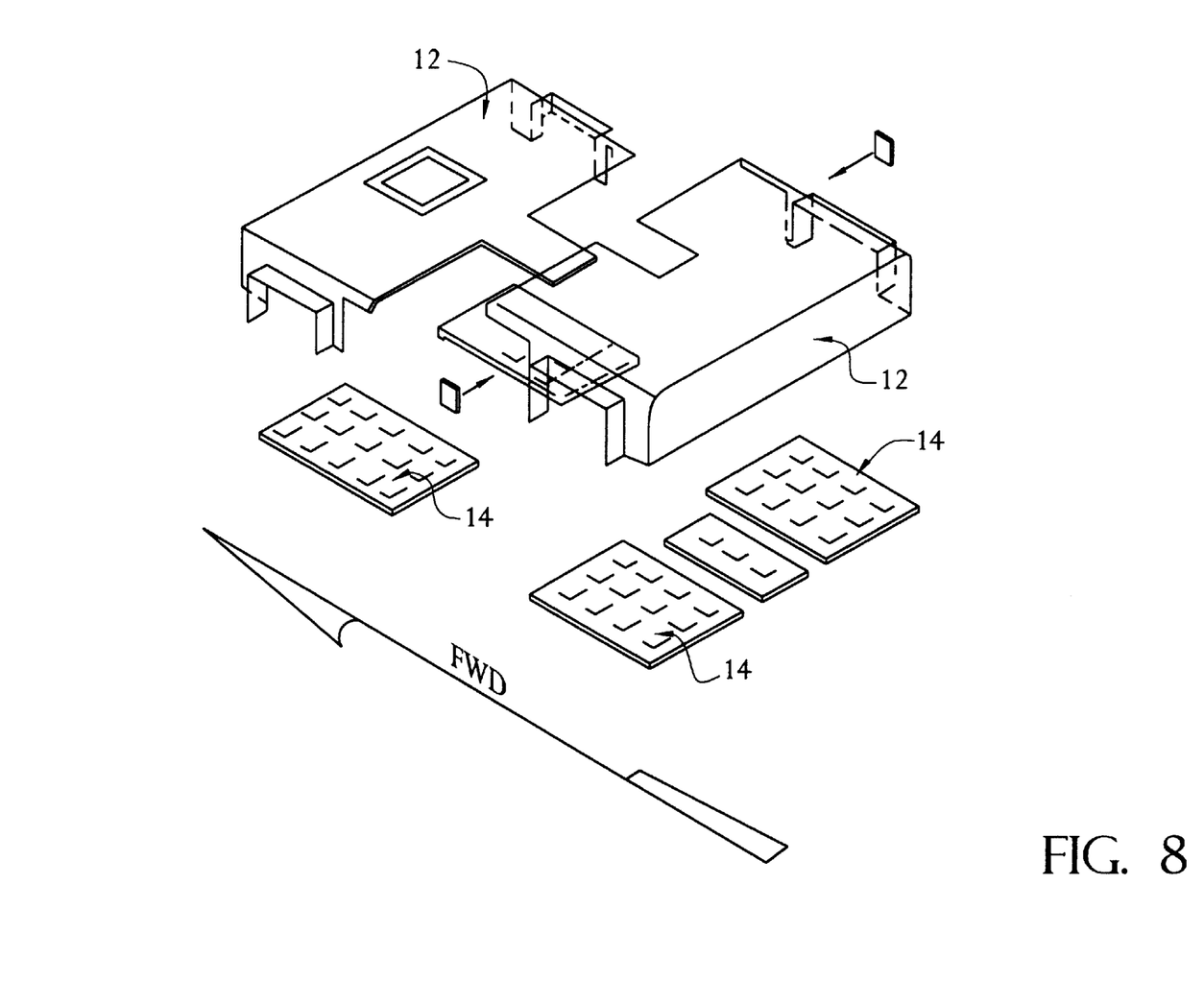
FIG. 8 illustrates the mounting arrangement for multiple acoustic blankets according to the embodiment of the invention shown in FIG. 7 in the cabin of a Sikorsky Aircraft Corporation S-76 aircraft.

Referring to FIG. 8, a plurality of blankets 10 according to the present invention are shown as they are intended to be incorporated into the cabin of the Sikorsky Aircraft Corporation S-76 aircraft. In this embodiment of the invention, the mass barrier portion 12 of each blanket 10 is mounted to the airframe structure. More particularly, and with reference to FIG. 7, the mass barrier portion 12 is attached to the inner flanges IF of the main beams and frames with a VELCRO or similar type fastener 26. (VELCRO is a registered trademark of Velcro Industries B.V.) The multiple layers 16 are preferably stitched 18 at the point where the mass barrier portion 12 attaches to the frame to prevent sagging at that location. The attachment of the mass barrier portion 12 to the airframe IF provides an acoustic seal which traps acoustic energy between the skins and the interior cabin panels. The segment of the mass barrier portion 12 between the inner flanges IF is allowed to sag to maximize the acoustic characteristics of the mass barrier portion 12, which is a function of it's limpness. By substantially reducing or eliminating any tensile forces in the mass barrier such that it is limp at all times, no vibratory forces are transmitted from the adjacent frames F into the barrier 12. The elimination of these energy paths results in less noise being transmitted into the cabin interior.

In this embodiment of the invention, the foam portion 14 is not attached to the mass barrier portion 12. Instead, the foam portion 14 is attached to the external surface of the cabin interior panel P using a suitable acrylic adhesive. Separating the foam layer 20 from the vinyl barrier layer 12 reduces the stiffness and allows relative motion between the airframe and ceiling blanket kit, thereby improving the noise attenuating properties of the vinyl layer 12.

Figure 9:
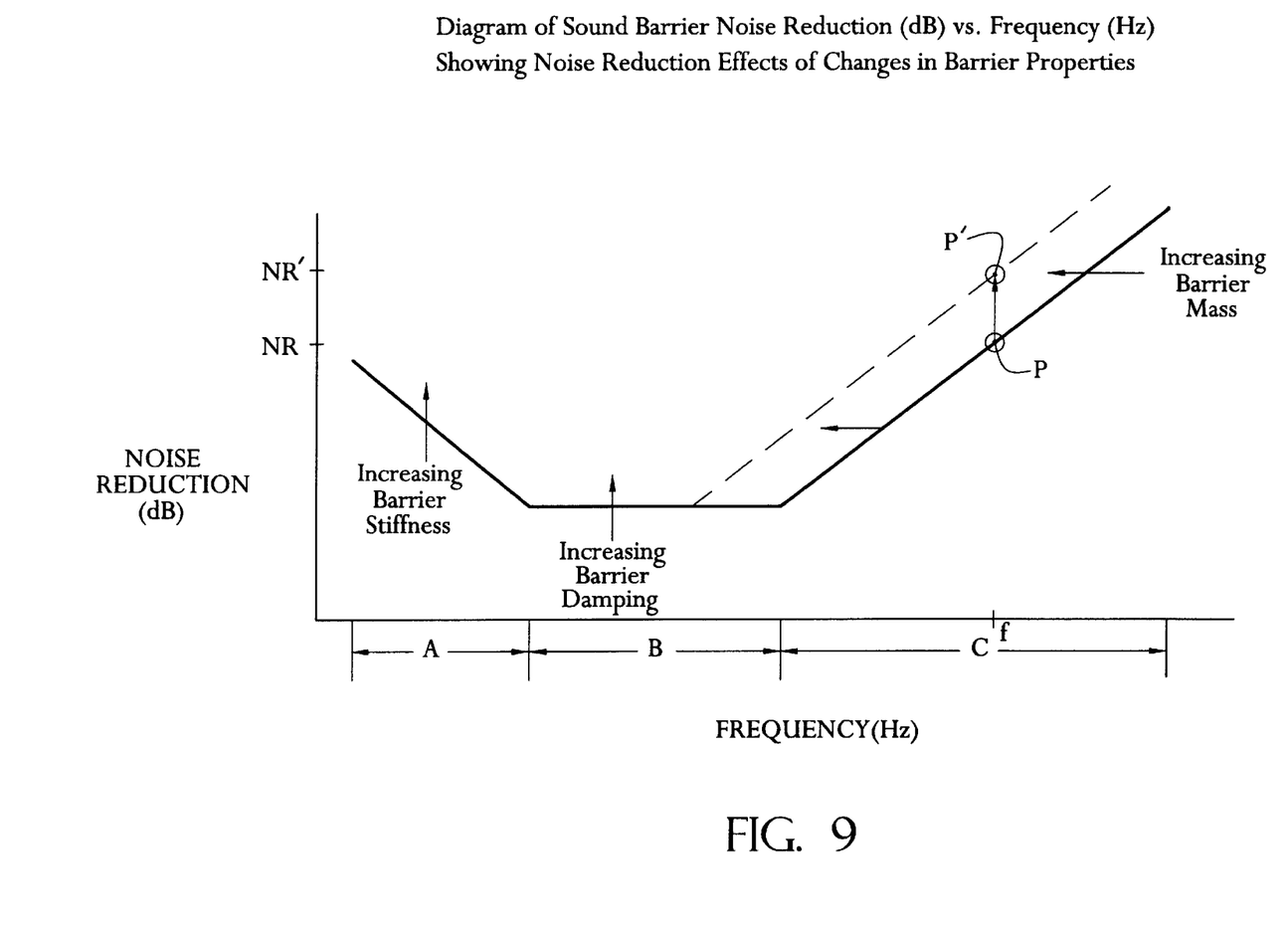
FIG. 9 is a graphical representation of noise reduction versus frequency for noise reducing blankets.

Referring now to FIG. 9, a graphical illustration is provided of a noise reduction versus frequency plot. The solid line represents a typical plot which includes three distinct frequency zones. Zone A, which represents the low range of frequencies, is the portion of the frequency range where the amount of noise reduction is controlled by the stiffness characteristics of the barrier 12. As the stiffness is increased, the noise reduction increases. Zone B represents the mid-range of frequencies and is the portion of the frequency range where the damping characteristics of the barrier 12 determines the amount of noise reduction. As the damping characteristics of the barrier 12 increase, so to does the overall noise reduction. Zone C represents the high-range of frequencies and is the portion of the frequency range where the mass, measured in lbs./ft$^2$, of the barrier 12 controls the noise reduction. As the effective mass is increased, the amount of noise reduction increases.

Assuming the solid line in FIG. 9 represents the noise reduction to frequency plot for a barrier 12 prior to optimization, with point P representing a selected point at frequency $f$ and noise reduction NR, it is desirable to modify the structure to shift the curve to the left as shown by the dashed line. This is accomplished by reducing the stiffness and/or increasing the damping characteristics of the barrier 12. As a result, for the same frequency $f$, a higher noise reduction NR' can be obtained at point P'. The present invention does this in two ways. First, it increases the damping of the barrier 12 by using multiple vinyl layers which have frictional damping as they vibrate at a high frequency. Second, it reduces the overall stiffness of the barrier 12 by using multiple vinyl layers such that the stiffness of the multi-layer vinyl construction is no greater than the stiffness of any single thin sheet used in the construction. This is much less than the stiffness of a single thicker sheet of vinyl of the same overall mass. furthermore, by using a multi-layer construction with thin, limp mass sheets 16 connected only at their edges or at spaced apart locations, the stiffness is significantly reduced. This moves the Zone C line of FIG. 9 to the left, thus increasing the noise reduction at the frequency of interest $f$.

Several acoustic blankets 10 made in accordance with the present invention were tested in a Sikorsky Aircraft Corporation S-76 aircraft on a comparative basis with the prior art blanket system shown in FIGS. 1 and 1A. The test results showed that the an acoustic blanket 10 made in accordance with the present invention had significantly better noise reduction compared to the prior art design. This was unexpected considering that the blanket 10 made according to the present invention weighs less than the prior art blanket (7/10–8/10 lb/ft$^2$ for present invention vs. 1–1.5 lb/ft$^2$ for the prior art design).

As a further benefit, the configuration of the blanket 10 according to the present invention has resulted in an acoustic barrier which is 25% less expensive to fabricate and install than comparable designs.

Although the invention has been described and illustrated with respect to the exemplary embodiments thereof, it should be understood by those skilled in the art that the foregoing and various other changes, omissions and additions may be made therein and thereto, without departing from the spirit and scope of the present invention.

What is claimed is:

1. A noise reducing blanket for use in an aircraft cabin for reducing acoustic noise transmission from an aircraft airframe to a cabin interior, the blanket comprising:
   a mass barrier portion that includes a plurality of vinyl layers attached to one another at spaced apart locations so as to move substantially independently from one another between attachment locations;
   a foam portion, the foam portion having at least one cavity formed in it; and
   a vapor barrier disposed about the foam portion.

2. A noise reducing blanket according to claim 1 wherein the foam portion is attached to the mass barrier portion.

3. A noise reducing blanket according to claim 1 wherein the layers are attached to one another by stitching.

4. A noise reducing blanket according to claim 3 wherein there are between approximately three to five stitches per inch.

5. A noise reducing blanket according to claim 1 wherein the layers are loaded with material to increase their mass.

6. A noise reducing blanket according to claim 5 wherein the material is selected from a group consisting of mica and barium sulfate.

7. A noise reducing blanket according to claim 1 wherein there are at least two layers in the mass barrier portion.

8. A noise reducing blanket according to claim 7 wherein there are between 2 and 4 layers in the mass barrier portion.

9. A noise reducing blanket according to claim 1 wherein the foam portion is at least ¾ inch thick.

10. A noise reducing blanket according to claim 1 wherein the vapor barrier is made from a polyvinyl fluoride material.

11. A noise reducing blanket according to claim 1 wherein there are a plurality of cavities formed in the foam portion.

12. A noise reducing blanket for use in an aircraft cabin for reducing acoustic noise transmission from an aircraft airframe to a cabin interior, the blanket comprising:

a mass barrier portion;

a foam portion having at least one cavity formed in it; and a vapor barrier disposed about the foam portion;

wherein at least one of the dimensions of the at least one cavity in the foam portion is approximately ¼ the wavelength of the dominant noise frequency to provide a resonant chamber within the foam portion.

13. A noise reducing blanket for use in an aircraft cabin for reducing acoustic noise transmission from an aircraft airframe to a cabin interior, the blanket comprising:

a mass barrier portion including a plurality of vinyl layers attached to one another at spaced apart locations so as to move substantially independently from one another between attachment locations;

a foam portion having a plurality of cavities formed in it, at least one of the dimensions of the cavities in the foam portion being approximately ¼ the wavelength of the dominant noise frequency to provide a resonant chamber within the foam portion; and a vapor barrier disposed about the foam portion.

14. A noise reducing blanket according to claim 13 wherein there are between 2 and 4 layers in the mass barrier portion.

15. A noise reducing blanket according to claim 13 wherein the layers are loaded with material to increase their mass.

16. A noise reducing blanket according to claim 13 wherein the vapor barrier is made from a polyvinyl fluoride material.

17. A noise reducing blanket for use in an aircraft cabin for reducing acoustic noise transmission from an aircraft airframe to a cabin interior, the blanket comprising:

a foam portion having at least one cavity formed in it;

a vapor barrier completely surrounding the foam portion;

a mass barrier portion disposed outside the vapor barrier so as to move substantially independently from the vapor barrier, the combination of the mass barrier and the foam portion providing reduction in acoustic noise transmission.

\* \* \* \* \*